(12) United States Patent
Higgs et al.

(10) Patent No.: US 10,248,509 B2
(45) Date of Patent: Apr. 2, 2019

(54) EXECUTING COMPUTER INSTRUCTION INCLUDING ASYNCHRONOUS OPERATION

(71) Applicant: INTERNATIONAL BUSINESS MACHINES CORPORATION, Armonk, NY (US)

(72) Inventors: Raymond M. Higgs, Poughkeepsie, NY (US); Luke M. Hopkins, Peterborough, NH (US); Mushfiq U. Saleheen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 15/352,995

(22) Filed: Nov. 16, 2016

(65) Prior Publication Data
US 2018/0137009 A1    May 17, 2018

(51) Int. Cl.
*G06F 11/00*    (2006.01)
*G06F 11/14*    (2006.01)

(52) U.S. Cl.
CPC ...... *G06F 11/1438* (2013.01); *G06F 11/1471* (2013.01); *G06F 2201/84* (2013.01)

(58) Field of Classification Search
CPC .................. G06F 11/1438; G06F 11/1471
See application file for complete search history.

(56) References Cited

U.S. PATENT DOCUMENTS

| 6,438,138 | B1 * | 8/2002 | Kamiya | H04L 12/5602 |
| | | | | 370/232 |
| 7,065,618 | B1 | 6/2006 | Ghemawat et al. | |
| 9,137,341 | B1 | 9/2015 | Bagchi et al. | |
| 9,318,137 | B1 | 4/2016 | Chan et al. | |
| 2018/0113745 | A1 * | 4/2018 | Yabe | G06F 9/4837 |

FOREIGN PATENT DOCUMENTS

| CN | 202600778 U | * 12/2012 |
| WO | 1996025705 A1 | 8/1996 |

* cited by examiner

*Primary Examiner* — Bryce P Bonzo
*Assistant Examiner* — Katherine Lin
(74) *Attorney, Agent, or Firm* — Cantor Colburn LLP; Steven Chiu

(57) ABSTRACT

Technical solutions are described for executing a computer instruction including an asynchronous operation. An example method includes computing parameters associated with the asynchronous operation, and transmitting a command for executing the asynchronous operation by an external device. The method also includes intercepting and storing, by an interface logic controller, the parameters associated with the asynchronous operation into one or more log registers. The method also includes receiving a response to the asynchronous operation. In response to the asynchronous operation being a success, executing a next instruction by the processing element. In response to the asynchronous operation being a failure, a processing element accesses the parameters from the log registers, and restarts the asynchronous operation using the parameters from the one or more log registers.

15 Claims, 5 Drawing Sheets

---

Relaunch the asynchronous operation using data stored in the log registers    470

Access stored parameters in the log registers based on the tag of the asynchronous operation    472

Read the stored parameters and construct the command with the parameters    474

Reuse the same tag when relaunching the asynchronous operation    476

EXECUTING COMPUTER INSTRUCTION INCLUDING ASYNCHRONOUS OPERATION

BACKGROUND

The present application relates to computer systems, and more specifically, to recovering from a failure of an asynchronous operation, particularly in the case of resource-constrained processing elements executing a computer executable instruction that includes an asynchronous operation.

In computer systems, an asynchronous, or non-sequential operation is an operation that permits other processing to continue while the asynchronous operation executes independently. In other words, an asynchronous operation represents an operation whose execution can continue independently or in the background. Typically, high latency operations are handled asynchronously in computer systems to increase utilization and throughput of resources in the computer systems.

SUMMARY

According to one or more embodiments, a computer-implemented method for executing a computer instruction including an asynchronous operation includes computing, by a processing element, parameters associated with the asynchronous operation, and transmitting, via a communication interface, a command for executing the asynchronous operation by an external device. The computer-implemented method also includes intercepting and storing, by an interface logic controller, the parameters associated with the asynchronous operation into one or more log registers. The computer-implemented method also includes receiving, by the processing element, a response to the asynchronous operation, the response being indicative of whether the asynchronous operation was a success or a failure. The computer-implemented method also includes in response to the asynchronous operation being a success, executing a next instruction by the processing element. In response to the asynchronous operation being a failure, the processing element accesses the parameters associated with the asynchronous operation from the one or more log registers, and restarting the asynchronous operation using the parameters from the one or more log registers.

According to one or more embodiments, a system for executing a computer instruction, includes a processing element coupled with an external device that executes one or more operations asynchronously. The system also includes a communication interface configured to facilitate the processing element to transmit a command for an asynchronous operation to the external device. The system further includes an interface logic unit coupled to the communication interface and the processing element. The processing element is configured to compute parameters associated with the asynchronous operation, and transmit, via the communication interface, a command for executing the asynchronous operation by the external device. The interface logic unit is configured to intercept and store the parameters associated with the asynchronous operation into one or more log registers. The processing element is further configured to receive a response to the asynchronous operation, the response being indicative of whether the asynchronous operation was a success or a failure. In response to the asynchronous operation being a success, the processing element executes a next instruction. In response to the asynchronous operation being a failure the processing element accesses the parameters associated with the asynchronous operation from the one or more log registers, and restarts the asynchronous operation using the parameters from the one or more log registers.

According to one or more embodiments, a processing unit includes a processing element, and an interface logic unit coupled with the processing element. The interface logic unit includes a controller, and a set of registers. The controller intercepts parameters associated with an asynchronous operation transmitted by the processing element for execution by an external device. The controller also stores the parameters that are intercepted the registers. The controller, in response to the processing element relaunching the asynchronous operation because of a failure of the asynchronous operation, provides access to the registers to the processing element for using the parameters that are stored in the registers.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
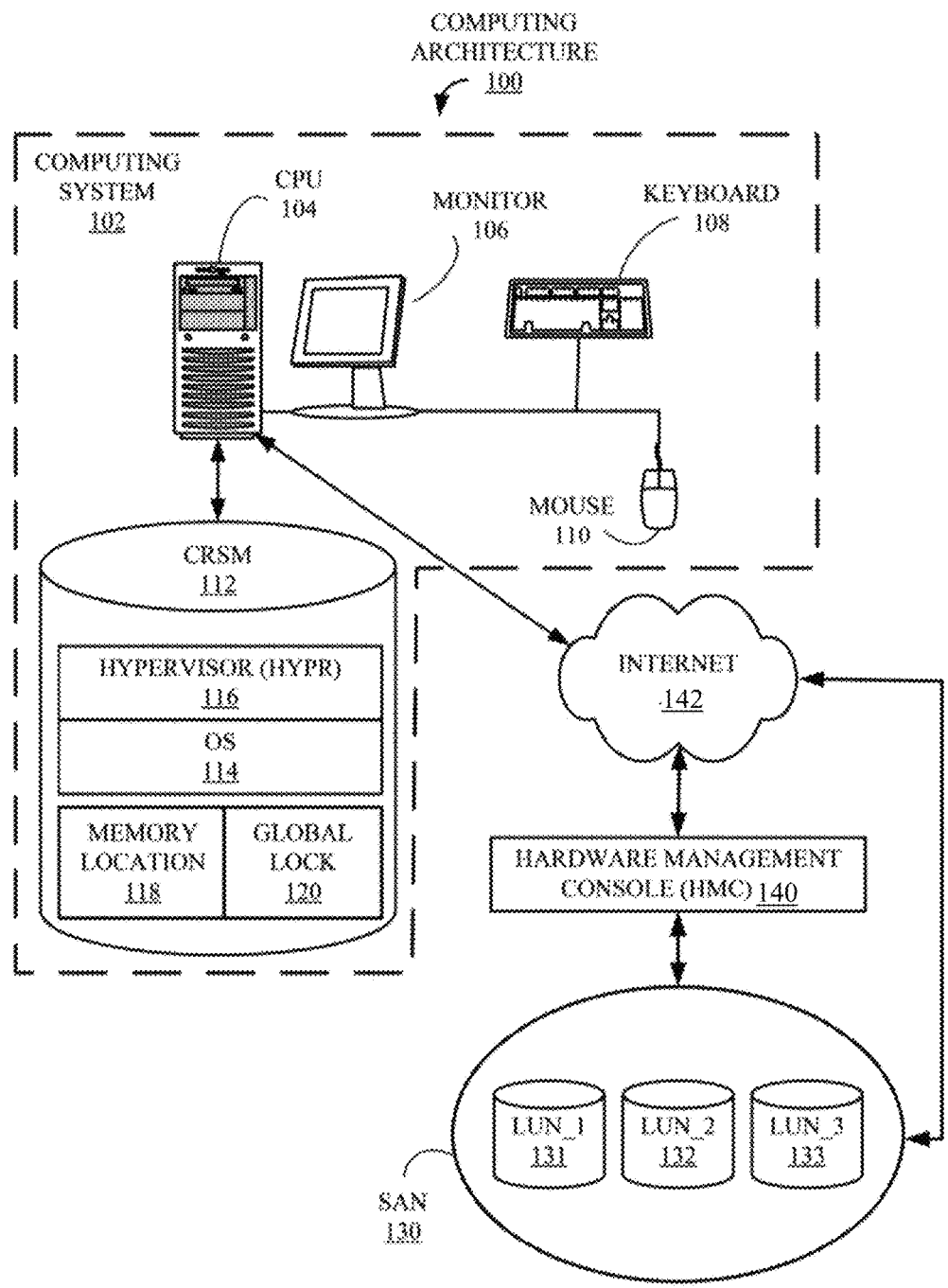
FIG. 1 is a computing architecture, according to one or more embodiments.

The technical solutions described herein facilitate transparent and automatic capture of the state of an asynchronous operation, external to a resource constrained processing element. The captured state facilitates the resource constrained processing element to re-issue the operation in case of failure. As such the technical solutions are rooted in and/or tied to computer technology in order to overcome a problem specifically arising in the realm of computers, specifically computer systems in which multiple processing elements delegate operations to one another for asynchronous execution.

Typically, a computer system handles high latency operations in an asynchronous manner to increase utilization and throughput of the computer system. For example, asynchronous operations facilitate deferring operations with high latency or low priority, to improve performance, responsiveness, and/or composability of computer program products. Typically, asynchronous operations are employed using some combination of event-driven programming and callbacks, and optionally making use of concurrency through co-routines and/or threads. Asynchronous operations may be used in many situations, such as handling user input in UIs and games, processing network traffic, performing disk I/O, batching work, and so on. Asynchronous operations can improve throughput and improve responsiveness by reducing the total latency of job batches when executed in parallel. Further, asynchronous operations can also result in an increase in system throughput at the cost of increased operational latency resulting from deferred processing.

In one or more examples, initiating the asynchronous operation includes computation of one or more parameters used during execution of the operation. Alternatively, or in addition, the parameters may be used to initialize hardware facilities prior to beginning execution of the asynchronous operation. Once the asynchronous operation is initiated, the processing element will be engaged in other work. The technical solutions described herein use an interface control logic unit and log registers to capture the state of the asynchronous operation, prior to launching the operation. The log registers are made available to the processing element to provide data for re-issuing the failing instruction that was issued previously. Accordingly, the processing element can reissue the asynchronous operation without recalculating parameters used by the asynchronous operation.

If the processing element is resource constrained, it may not save the one or more parameters. Further, in the case of being resource constrained, the processing element may not save a program state that was used to initialize the hardware prior to beginning the execution of the asynchronous operation. By not saving the parameters and/or program state, the processing element saves resources that may instead be used for execution of the asynchronous operation. If the asynchronous operation succeeds, this fact is of limited consequence, however, if the operation fails, a recovery procedure is invoked. If the recovery procedure includes retrying the asynchronous operation, then the parameters that were used to initialize the hardware have to be recomputed. In one or more examples, depending on distinct sections of code that employ the hardware resources, calculating the parameters may have to be performed in specific manners associated with the hardware resources. Thus, there may not be a uniform way of configuring the recovery procedure to retry the asynchronous operation. Further yet, the recalculation of the parameters and/or the hardware initialization state is both space (or resource) and time consuming, which can be prohibitive on the resource-constrained processing element that may be limited in terms of memory, registers, and/or processing power.

The technical features described herein address such technical problems in computer systems when executing an asynchronous operation. In one or more examples, the technical features facilitate an automatic capture of the state of the asynchronous operation, which includes the parameter values and the hardware initialization parameters, external to the resource constrained processing element. The technical features thus facilitate the resource constrained processor to re-issue the operation if it fails based on the captured state. An interface control logic and log-registers, external to the processing element, are used to capture the state of the asynchronous operation. The log-registers are made available to the processing element to provide information for the failing instruction that was issued.

FIG. 1 is a computing architecture 100 on which the technical solutions described herein may be implemented. A computing system 102 includes a central processing element (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may be either dynamic or non-dynamic memory and incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114, a hypervisor (HYPR) 116, a memory location 118 and a global lock 120, associated with memory location 118 and implemented in accordance with the disclosed technology.

Computing system 102 is connected to the Internet 142, which is also connected to a hardware management console (HMC) 140. Although in this example, computing system 102 and HMC 140 are communicatively coupled via the internet 142, they could also be coupled through any number of communication mediums such as, but not limited to, a local area network (LAN) and a wide area network (WAN). The HMC 140 enables an administrator to configure and control the various elements of computing architecture 100, including, but not limited to, computing system 102, HYPR 116 and a storage area network (SAN) 130. SAN 130 is illustrated as containing three storage devices, or logical units, i.e. a LUN-1 131, a LUN-2 132 and a LUN-3 133. It should be noted there are many possible computing system configurations, of which computing system architecture 100 is only one simple example employed herein as an example of one system that may implement the technical solutions described herein.

Figure 2:
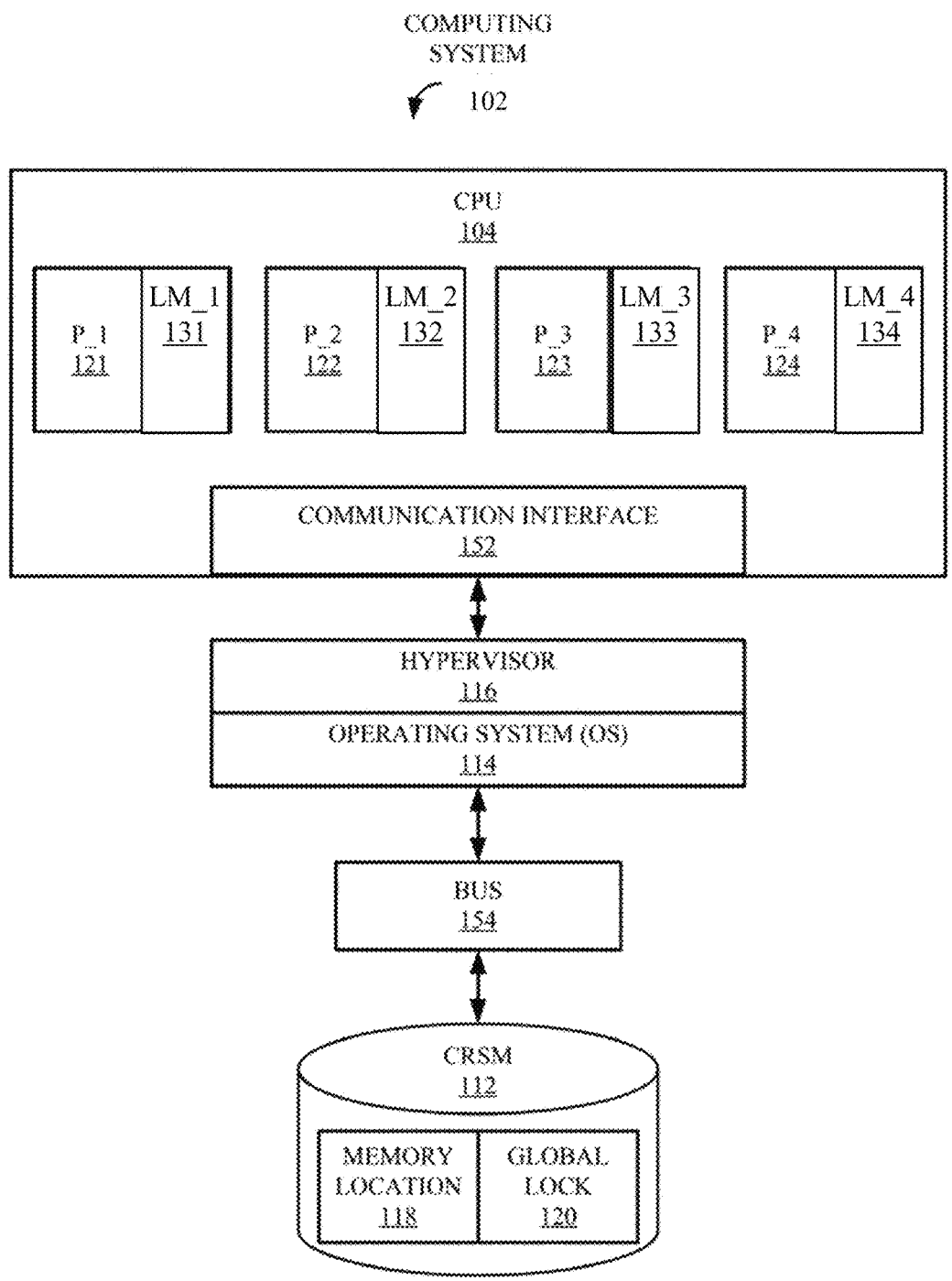
FIG. 2 is a block diagram showing elements of FIG. 1 in more detail, in accordance with one or more embodiments.

FIG. 2 is a block diagram showing elements of FIG. 1 in more detail. Included from FIG. 1 are CPU 104, CRSM 112, OS 114, HYPR 116, memory location 118 and global lock 120. Also illustrated are several processing elements associated with the CPU 104, i.e. a processing element 1, or "P-1," 121, a processing element 2, or "P-2," 122, a processing element 3, or "P-3," 123 and a processing element 4, "P-4," 124. Each of the processing elements 121-124 is coupled to a local memory, i.e. a LM-1 131, a LM-2 132, a LM-3 133, and a LM-4 134, respectively. It should be noted that in other examples, the CPU 104 may include a different number of processing elements than those in the example(s) herein.

A communication interface 152 handles communication between CPU 104 and both OS 114 and HYPR 116. A communication bus 154 provides a path for signals to be transmitted among CPU 104, processing elements 121-124, communication interface 152, OS 114, HYPR 116 and CRSM 112.

Figure 3:
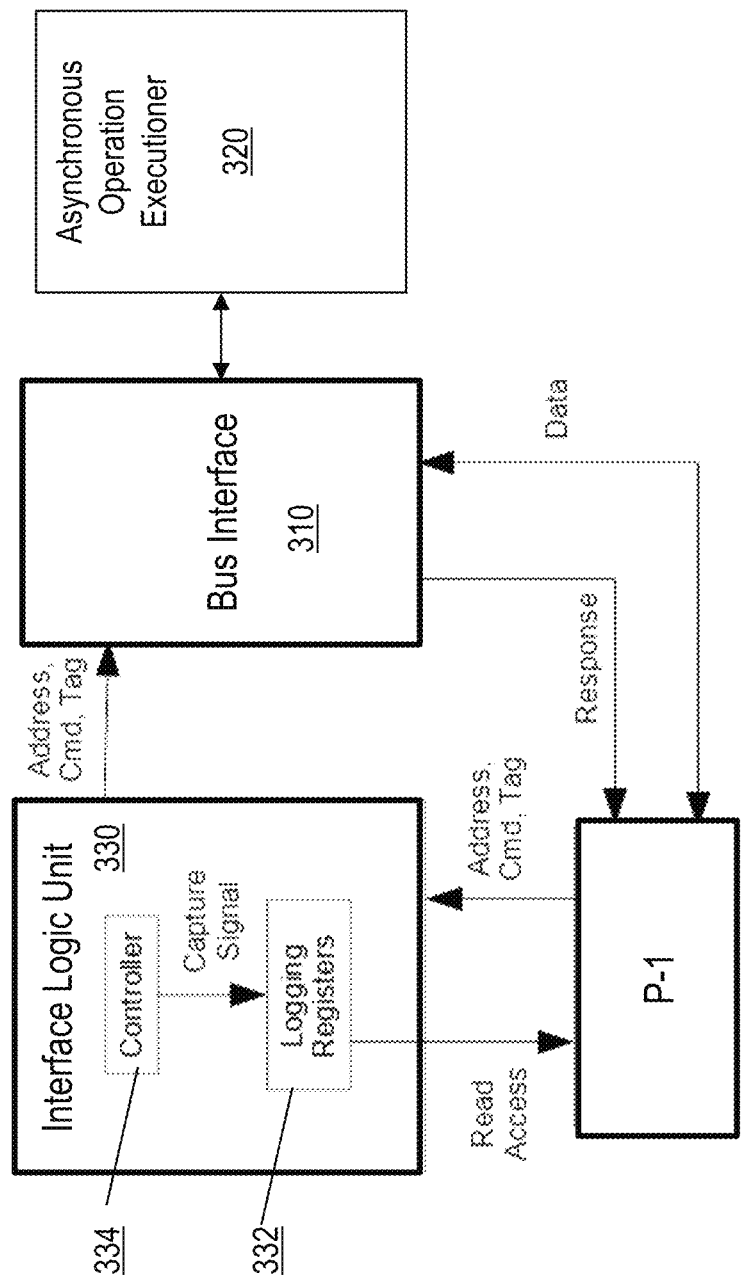
FIG. 3 depicts a block diagram of a CPU that includes an interface logic unit, in accordance with one or more embodiments.

FIG. 3 depicts a block diagram of the CPU 104 that illustrates a subset of the components of the CPU 104. In the example scenario depicted, the P-1 121 is coupled with a bus interface 310 that facilitates P-1 121 to conduct asynchronous operations. In one or more examples, the bus interface 310 facilitates P-1 121 to transmit an asynchronous operation for execution by an asynchronous operation executioner 320 device. The asynchronous operation executioner 320 is an external device with respect to P-1 121. In one or more examples, the asynchronous operation executioner 320 may be internal to the CPU 104, such as the communications interface 152. Alternatively, the asynchronous operation executioner 320 may be external to the CPU 104, such as the HMC 140. The bus interface 310 further facilitates receiving a response from the asynchronous operation executioner 320. The bus interface 310 may further facilitate P-1 121 to check a state of the asynchronous operation by inquiring with the asynchronous operation executioner 320. It should be noted that while FIG. 3 depicts P-1 121, the other processing elements from the CPU 104 are similarly coupled with the bus interface 310 for facilitating execution of the asynchronous operation(s). Further, in one or more examples, each of the processing elements 121-124 may be associated with a separate bus interface 310 respectively.

Typically, for executing an asynchronous operation, P-1 121 sends data for the asynchronous operation via the bus interface 310 to the asynchronous operation executioner 320 and receives the response in return. The data includes the command, address, and attributes associated with the operation, that P-1 121 calculates prior to transmitting the operation via the bus interface 310. In one or more examples, the asynchronous operation may be part of an instruction being executed by P-1 121. Accordingly, P-1 121 reaches a specific state during execution of the instruction, and in response to reaching the state, calculates the data and subsequently initiates the asynchronous operation via the bus interface 310.

Thus, typically, as described herein, if the asynchronous operation fails, P-1 121 recreates the specific state to restart the asynchronous operation. Recreating the specific state may include P-1 121 reinitializing the instruction of which the asynchronous operation is a part.

To avoid such recreation of the state, the technical solutions described herein add an interface logic unit 330 (see FIG. 3). The interface logic unit 330 is an electronic circuit that includes one or more log registers 332 and a controller 334. The interface logic unit is external to P-1 121. The interface logic unit 330 facilitates automatic capture and storage of a state associated with the asynchronous operation in a way that is completely transparent to P-1 121.

Accordingly, if the asynchronous operation fails, P-1 121 may read the state information from the log registers 332. Thus, the interface logic unit 330 facilitates P-1 121 to retry the asynchronous command without recalculating the command parameters and other data associated with the instruction for recreating the specific state. Alternatively, if the asynchronous operation succeeds, another asynchronous operation may be issued and the state of the next operation is automatically captured, overwriting the state that was saved for the previous successful operation. The log registers 332 stores the state of P-1 121 before the asynchronous operation is initiated. The state stored in the log registers 332 may include values of particular registers and/or memory locations, including, but not limited to storage keys, zone numbers, target addresses, interface tags, timeout values, data transfer sizes, and control values that are specific to the interface logic. In one or more examples, timestamp for when the operation was started, and a timeout value is also stored.

In one or more examples, each of the processing elements 121-124 has a corresponding interface logic unit 330. Alternatively, the CPU 104 has the interface logic unit 330 that is shared among the multiple processing units 121-124. Alternatively, each bus interface 310 in the CPU 104 that facilitates transmission of asynchronous command has a respective interface logic unit 330.

Referring back to FIG. 3, the controller 334 facilitates detecting that P-1 121 is issuing an asynchronous command via the bus interface 310, and in response stores the specific state of P-1 121 in the log registers 332. Further, the controller 334 facilitates P-1 121 to access and/or forward the contents of the log registers 332 to the asynchronous operation executioner 320 based on the response to the earlier issued asynchronous command. In one or more examples, the controller 334 captures and stores the data from P-1 121 to the asynchronous operation executioner 320 transparently, without P-1 121 having to specifically request such storing. Alternatively, in one or more examples, P-1 121 indicates to the controller 334 to store the data in the log registers 332. For example, the indication may include setting a flag (not shown) of the interface logic unit 330. Alternatively, or in addition, the indication may include setting a particular parameter in the asynchronous command being sent via the bus interface 310. In other examples, the indication may be provided in another manner than those listed above as examples.

Figure 4:
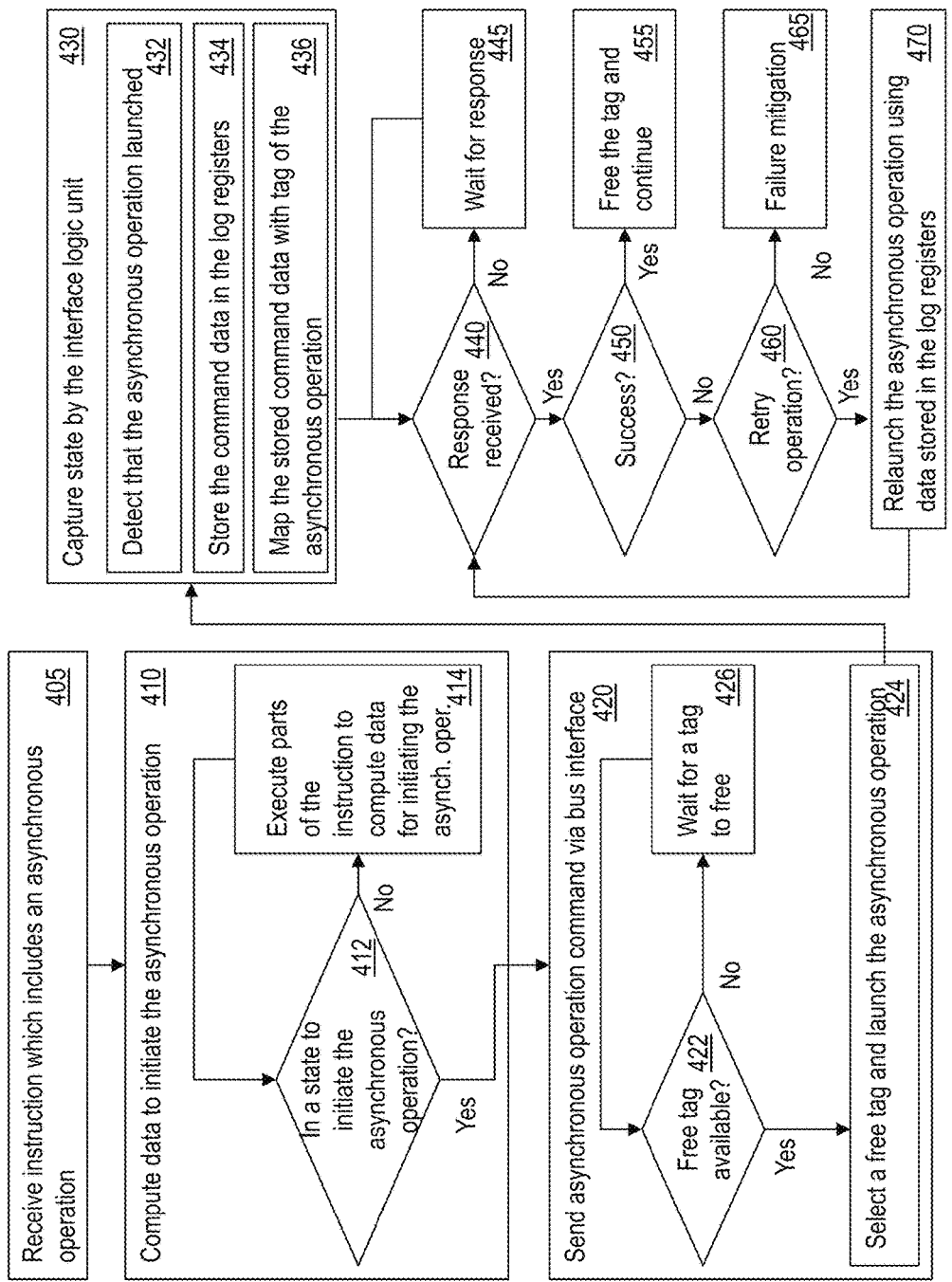
FIG. 4 illustrates a flowchart of an example method for executing, by a CPU, an instruction including an asynchronous operation, in accordance with one or more embodiments.

FIG. 4 illustrates a flowchart of an example method for executing, by the CPU 104, an instruction including an asynchronous operation. The CPU 104 receives an instruction for execution, where at least a part of the instruction includes an asynchronous operation, as shown at 405. For example, the instruction may be part of a computer program product that the CPU 104 is executing. In one or more examples, the CPU 104 assigns a processing element, say P-1 121, for executing the instruction, as shown at 410. It should be noted that any of the processing elements 121-124 from the CPU 104 may execute the instruction in other examples.

The assigned processing element P-1 121 computes the command, address, and attributes associated with the asynchronous operation, as shown at 410. Computing such data may include executing a portion of the instruction until the specific state is reached at which the asynchronous operation can be initiated, as shown at 412 and 414.

Once P-1 121 reaches the state to initiate the asynchronous operation, P-1 121 transmits the operation, by sending the command and other computed data to the asynchronous operation executioner 320 via the bus interface 310, as shown at 420. In one or more examples, sending the operation via the bus interface 310 may include selecting a free tag, as shown at 422. For example, the asynchronous operation executioner 320 may have a collection of tags associated with each respective operation that has been assigned to the asynchronous operation executioner 320. In one or more examples, the asynchronous operation executioner 320 has a predetermined number of tags in the collection of tags, where the number of tags represents a maximum number of operations that the asynchronous operation executioner 320 can queue. A tag is free if the corresponding entry in the queue is not associated with an outstanding asynchronous operation. In one or more examples, P-1 121 may have to wait for a tag to free, as shown at 426. Once the free tag is selected, P-1 121 launches the asynchronous operation, as shown at 424. P-1 121 is now free to perform other operations while waiting for a response from the bus interface 310, as shown at 440 and 445.

The controller in the interface logic unit 330 intercepts the launch of the asynchronous operation and captures the state of P-1 121 that is related to the asynchronous operation in the log registers 332, as shown at 430. In one or more examples, the controller 334 detects that the asynchronous operation has been launched, as shown at 432. For example, the controller 334 monitors the bus interface 310 for communication between P-1 121 and the asynchronous operation executioner 320. In one or more examples, the controller 334 detects the launch of the asynchronous operation based on the state of the tag selected for the asynchronous operation. In response to the launch, the controller 334 signals the log registers to capture the command parameters, as shown at 434. The state stored in the log-registers may include values of particular registers and/or memory locations, including, but not limited to: storage keys, zone numbers, target addresses, interface tags, starting timestamps, timeout values, data transfer sizes, and control values that are specific to the interface logic unit 330. The controller 334 further maps the stored parameters with the tag selected for the asynchronous operation, as shown at 436. For example, the controller 334 stores the tag with the parameters in the log registers 332. As described earlier, P-1 121 waits for a response from the bus interface 310, as shown at 440 and 445.

After some period of time, the bus interface 310 returns a response to P-1 121. The response includes the tag that P-1 121 selected when launching the asynchronous operation. The response indicates success or failure of the asynchronous operation. If the asynchronous operation was successful, the tag is freed for reuse, and P-1 121 continues with executing the instruction, as shown at 450 and 455. For example, if the (previous) asynchronous operation succeeds another (next) asynchronous operation may be issued and the state of that next operation is automatically captured, overwriting the state that was saved for the previous successful operation. In one or more examples, P-1 121 may have multiple asynchronous operations, each one independent of the other. For example, a first asynchronous operation associated with a first tag, and a second asynchronous operation associated with a second tag. In one or more examples, the multiple asynchronous operations may be issued for execution by the asynchronous operation executor 320, that is the same external device. Alternatively, one or more of the multiple asynchronous operations may be issued for a separate external device, distinct from the asynchronous operation executor 320.

Instead, if the asynchronous operation fails, the response indicates a type of failure. For example, the failure may be of a type such as timeout failure, protection check failure, count inconsistency, zone mismatch, and the like. For example, a timeout failure occurs due to reconfigurations of the system, such as changing processors/memory, which may change the time required for operations to complete. Also, if the system supports atomic operations like test-and-fetch, the time for completing the operation may vary, leading to timeout failures. In such cases of atomic operations, if the memory area is already locked for ensuring atomicity, a retry of the asynchronous operation may save computing resources. A protection check failure occurs when a storage key does not match. An address, and/or byte count inconsistency includes boundary crossing errors, memory runoffs, and the like. For example, in PCIE, 4 KB boundaries are used, and crossing that boundary may cause operation errors.

P-1 121 identifies the type of the failure in case of failure to check if the asynchronous operation can be retired, as shown at 460. If the type of the failure does not permit retrying the asynchronous operation, P-1 121 may proceed to perform a failure mitigation, as shown at 465. Alternatively, if the response indicates failure, and the failure is of a type that allows the asynchronous operation to be retried, then P-1 121 reads the log registers associated with the tag and then re-issues the asynchronous operation command via the bus interface 310, as shown at 470. Thus, P-1 121 relaunches the asynchronous operation without recalculating the command parameters.

Figure 5:
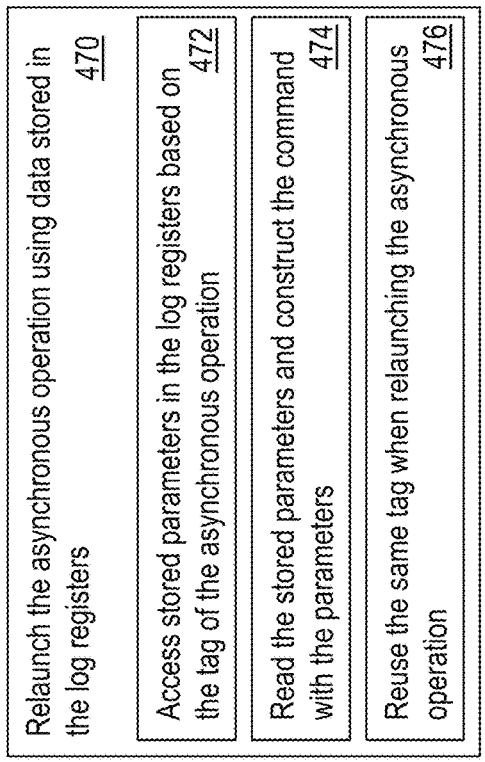
FIG. 5 illustrates details of re-issuing the asynchronous operation command via the bus interface in accordance with one or more embodiments.

FIG. 5 illustrates details of re-issuing the asynchronous operation command via the bus interface 310, as shown at 470. In one or more examples, P-1 121 accesses the data that the controller 334 stored in the log registers 332, as shown at 472. P-1 121 accesses the data based on the tag of the asynchronous operation, which the controller 334 matches with the data. Further, P-1 121 reads the stored data and constructs the command for the asynchronous operations using the data, as shown at 474. Further, P-1 121 reuses the same tag when relaunching the command for the asynchronous operation, as shown at 476. Accordingly, in case the operation fails again, the stored data can be reused based on the same tag.

In one or more examples, P-1 121 issues multiple asynchronous operations, such that multiple asynchronous operations are outstanding simultaneously. Each asynchronous operation uses a separate, respective tag. The asynchronous operations are independent of one another. Accordingly, P-1 121 may not wait for completion of a first asynchronous operation when a second instruction with another asynchronous operation is received.

In one or more examples, the computer program that includes the instruction with the second asynchronous operation may indicate that the second asynchronous operation is to be serialized. That is, P-1 121 has to wait for the first asynchronous operation to complete prior to initializing the second asynchronous operation. Alternatively, or in addition, the asynchronous operation executor 320 may have a limitation of one request at a time, and therefore supports only one tag. Accordingly, P-1 121 may have to wait for the completion of the first asynchronous operation that is associated with the tag prior to initiating the second operation. Alternatively, or in addition, even if the asynchronous operation executor 320 facilitates multiple asynchronous operations (i.e. has multiple tags), all the tags may be occupied by previously issued asynchronous operations. Accordingly, in receipt of the second instruction with the second asynchronous operation, P-1 121 waits for at least one of the asynchronous operations to complete for issuing the second asynchronous operation.

Thus, the technical features described herein facilitates P-1 121, instead of recreating a state for launching the asynchronous operation, which would take more time and resources, to use the log registers 332 to restore the state and restart the asynchronous operation. Accordingly, the technical features described herein facilitate a faster recovery compared to recreating the state, and thus improves the operation of the computer system 102.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer-implemented method for executing a computer instruction including an asynchronous operation, the method comprising:
   computing, by a processing element, parameters associated with the asynchronous operation, and transmitting, by the processing element, via a communication interface, a command for executing the asynchronous operation by an external device;
   intercepting and storing, by an interface logic controller, the parameters associated with the asynchronous operation into one or more log registers;
   assigning, by the processing element, a tag to the asynchronous operation, and mapping, by the interface logic controller, the tag assigned to the asynchronous operation with the log registers that store the parameters associated with the asynchronous operation;
   receiving, by the processing element, a response to the asynchronous operation, the response being indicative of whether the asynchronous operation was a success or a failure; and
   in response to the asynchronous operation being a success, executing a next instruction by the processing element, and
   in response to the asynchronous operation being a failure:
      accessing, by the processing element, the parameters associated with the asynchronous operation from the one or more log registers; and
      restarting the asynchronous operation using the parameters from the one or more log registers.

2. The computer-implemented method of claim 1, wherein, the interface logic controller intercepts and stores the parameters associated with the asynchronous operation in the log registers prior to relaying the asynchronous operation to the external device via the communication interface.

3. The computer-implemented method of claim 1, wherein the parameters associated with the asynchronous operation include addresses and attributes for execution of the asynchronous operation.

4. The computer-implemented method of claim 1, wherein the asynchronous operation is part of an instruction being executed by the processing element.

5. The computer-implemented method of claim 4, wherein the instruction is a first instruction, the method further comprising: receiving, by the processing element, a second instruction for execution, and in response determining, by the processing element, a state of the first instruction.

6. The computer-implemented method of claim 5, wherein the processing element identifies, from the log registers, the parameters associated with the asynchronous operation based on a tag assigned to the asynchronous operation.

7. A system for executing a computer instruction, the system comprising:
   a processing element coupled with an external device that executes one or more operations asynchronously; and
   a communication interface configured to facilitate the processing element to transmit a command for an asynchronous operation to the external device; and
   an interface logic unit coupled to the communication interface and the processing element; wherein:
   the processing element is configured to compute parameters associated with the asynchronous operation, transmit, via the communication interface, a command for executing the asynchronous operation by the external device, and assign a tag to the asynchronous operation;
   the interface logic unit is configured to intercept and store the parameters associated with the asynchronous operation into one or more log registers, and map the tag assigned to the asynchronous operation with the log registers that store the parameters associated with the asynchronous operation; and
   the processing element is further configured to:
      receive a response to the asynchronous operation, the response being indicative of whether the asynchronous operation was a success or a failure; and
      in response to the asynchronous operation being a success, execute a next instruction, and
      in response to the asynchronous operation being a failure:
         access the parameters associated with the asynchronous operation from the one or more log registers; and
         restart the asynchronous operation using the parameters from the one or more log registers.

8. The system of claim 7, wherein, the interface logic unit intercepts and stores the parameters associated with the asynchronous operation in the log registers prior to relaying the asynchronous operation to the external device via the communication interface.

9. The system of claim 7, wherein the parameters associated with the asynchronous operation include addresses and attributes for execution of the asynchronous operation.

10. The system of claim 7, wherein the asynchronous operation is part of an instruction being executed by the processing element.

11. The system of claim 7, wherein the interface logic unit further comprises the log registers and a controller.

12. A processing unit comprising:
   a processing element; and
   an interface logic unit coupled with the processing element, the interface logic unit comprising:
      a controller; and
      a set of registers; and,
      wherein the controller is configured to:
         intercept parameters associated with an asynchronous operation transmitted by the processing element for execution by an external device;
         store the parameters that are intercepted in the registers;

map the registers used to store the parameters with a tag associated with the asynchronous operation; and in response to the processing element relaunching the asynchronous operation because of a failure of the asynchronous operation, providing access to the registers to the processing element for using the parameters that are stored in the registers.

13. The processing unit of claim 12, wherein, the controller intercepts and stores the parameters associated with the asynchronous operation in the registers prior to relaying the asynchronous operation to the external device.

14. The processing unit of claim 12, wherein the controller intercepts the parameters by monitoring a communication interface that facilitates the processing element to transmit the asynchronous operation to the external device.

15. The processing unit of claim 12, wherein the asynchronous operation is part of an instruction being executed by the processing element.

* * * * *